United States Patent [19]
Yagasaki

[11] Patent Number: 5,901,255
[45] Date of Patent: May 4, 1999

[54] PATTERN RECOGNITION METHOD AND APPARATUS CAPABLE OF SELECTING ANOTHER ONE OF PLURAL PATTERN RECOGNITION MODES IN RESPONSE TO A NUMBER OF REJECTS OF RECOGNITION-PROCESSED PATTERN SEGMENTS

[75] Inventor: Toshiaki Yagasaki, Irvine, Calif.

[73] Assignee: Canon Kabushiki Kaisha, Tokyo, Japan

[21] Appl. No.: 07/832,725

[22] Filed: Feb. 7, 1992

[51] Int. Cl.$^6$ .................................................. G06K 9/00
[52] U.S. Cl. .......................................... 382/310; 382/227
[58] Field of Search .................................... 382/38, 9, 14, 382/15, 13, 224, 227, 226, 309, 310, 192; 395/800

[56] References Cited

U.S. PATENT DOCUMENTS

| | | | |
|---|---|---|---|
| 4,521,909 | 6/1985 | Wang | 382/38 |
| 4,551,851 | 11/1985 | Kochert | 382/38 |
| 4,680,804 | 7/1987 | Kuzunuki | 382/13 |
| 4,701,807 | 10/1987 | Ogino | 358/284 |
| 4,972,499 | 11/1990 | Kurosawa | 382/38 |
| 5,008,948 | 4/1991 | Tsukawaki | 382/13 |
| 5,040,223 | 8/1991 | Kamiya | 382/38 |
| 5,077,807 | 12/1991 | Bosker | 382/14 |
| 5,111,514 | 5/1992 | Ohta | 382/9 |
| 5,119,438 | 6/1992 | Ueda | 382/14 |
| 5,191,622 | 3/1993 | Shojima et al. | 382/13 |
| 5,303,381 | 4/1994 | Yagasaki | 395/800 |

FOREIGN PATENT DOCUMENTS

| | | |
|---|---|---|
| 043571 | 7/1981 | European Pat. Off. . |
| 59-45585 | 3/1984 | Japan . |
| 59-71581 | 4/1984 | Japan . |
| 2202689 | 8/1990 | Japan . |

OTHER PUBLICATIONS

J. Reines, et al. "Specimen Identification Device", IBM Technical Disclosure Bulletin, vol. 6, No. 1, Jun., 1963, p. 111.

"Automatic Font Selection For Character Recognition", IBM Technical Disclosure Bulletin, vol. 30 , No. 3, Aug., 1987, pp. 1112–1114.

A. Cutaia "Multilevel Character Recognition System", IBM Technical Disclosure Bulletin. vol. 13. No. 12, May 1971.

*Primary Examiner*—Yon J. Couso
*Attorney, Agent, or Firm*—Fitzpatrick, Cella, Harper & Scinto

[57] ABSTRACT

Pattern recognition apparatus and method which provides plural pattern recognition modes, one of which is selected in accordance with characteristics of an unknown pattern to be recognized. The pattern recognition apparatus includes a pattern recognizer having plural recognition modes for comparing an unknown pattern with at least one known pattern, and a selector for selecting one of the plural recognition modes based on characteristics of the unknown pattern. In one aspect, the selection of one of the plural recognition modes is based on font size, font type and image quality, and in another aspect, selection of the recognition mode is based on the results of prior pattern recognition operations. The pattern recognition apparatus may be provided in a stand-alone device, and this device may interface to a local area network bus. Alternatively, the pattern recognition apparatus may be distributed such that individual components thereof are provided independently on a local area network bus and provided with individual servers for interface with stand-alone computers. In the case where computers perform character processing or word processing, a preview mode may be provided so that the results of character recognition may be previewed before transmitting image information to a remote location.

36 Claims, 14 Drawing Sheets

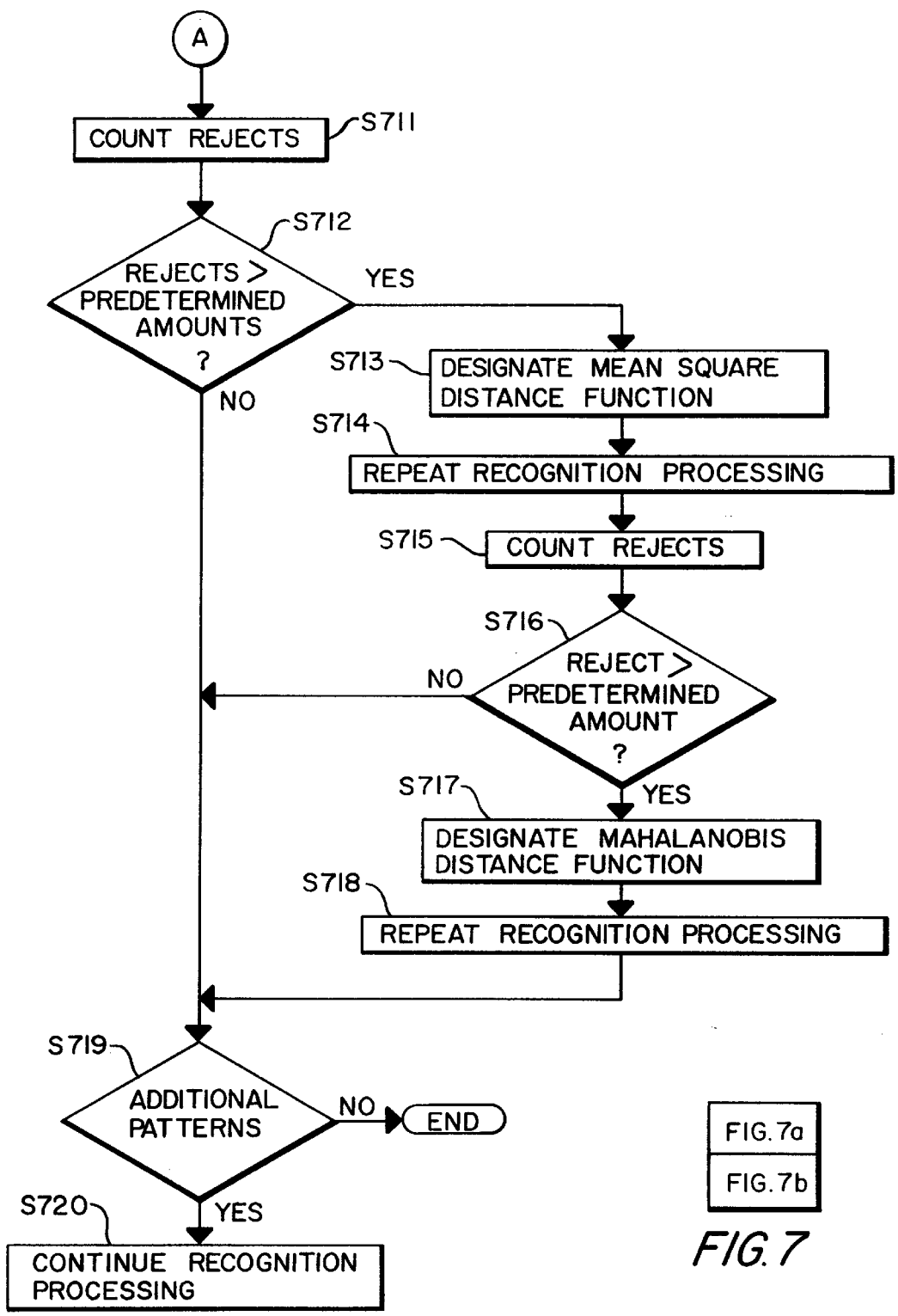

PATTERN RECOGNITION METHOD AND APPARATUS CAPABLE OF SELECTING ANOTHER ONE OF PLURAL PATTERN RECOGNITION MODES IN RESPONSE TO A NUMBER OF REJECTS OF RECOGNITION-PROCESSED PATTERN SEGMENTS

BACKGROUND OF THE INVENTION

1. Field of the Invention

The present invention pertains to a method and apparatus for pattern recognition, and in particular to a system which adapts to the characteristics of an unknown pattern to be recognized.

2. Description of the Related Art

In a pattern recognition system, an unknown pattern, for example, a pattern derived from an image scanner or received by facsimile transmission, is analyzed to determine the identity of the pattern. FIG. 16 illustrates a typical pattern recognition process which identifies individual characters in an image which contains plural such characters.

As shown in FIG. 16, an image, derived for example, from an image scanner, is input in step S1601 and the individual characters in the image are segmented in step S1602. Steps S1601 and S1602 are typically performed by a general purpose host computer which then transmits the characters segmented in step S1602 to a dedicated optical character recognition device. In step S1603, the optical character recognition device subjects the segmented characters to feature extraction whereby a feature vector is derived for the unknown pattern. The feature vector represents various features concerning the pattern such as stroke position, direction, length, and so forth. Then, in rough classification step 1604, the feature vector for the unknown pattern is then compared to a dictionary which contains plural feature vectors for standard patterns. Specifically, the feature vector for the unknown pattern is compared with each feature vector in the standard pattern dictionary and a distance value is calculated representing the mathematical distance between the feature vector for the unknown pattern and the feature vector for the standard pattern. The distance values are sorted and the best candidates, for example, the 52 candidates that are nearest to the feature vector for the unknown pattern, are selected. In step S1605, the best candidates are subjected to detailed classification. In detail classification, additional discriminant functions, for example a pseudo-bayesian discriminant function, are employed to select the best candidate or candidates from among those determined in the rough classification step. The best candidate or candidates for the unknown pattern are then transmitted back to the general purpose host computer where they are subjected to post processing in step S1606. Post processing typically entails processing such as spell-checking, context checking and syntax processing and results in selection of one candidate for the unknown pattern.

While the process depicted in FIG. 16 permits identification of unknown patterns with high accuracy, there still remains a problem. Specifically, patterns to be recognized usually do not have uniform quality or characteristics, and it is not always possible to recognize unknown patterns that have characteristics other than those that are expected.

SUMMARY

It is therefore an object of the present invention to provide a character recognition system which adapts to the characteristics of the pattern to be recognized.

In one aspect, the invention is a pattern recognition apparatus, or a method for pattern recognition, in which a pattern recognizer has plural recognition modes for comparing an unknown pattern with at least one known pattern, and a selector selects one of the plural recognition modes based on the characteristics of the pattern to be recognized. The selector may select the recognition mode based on the results of prior pattern recognition, and in particular, may select a recognition mode such that the discriminant function used in recognizing patterns is changed or such that a dictionary of known patterns is changed.

In another aspect, the invention is a pattern recognition apparatus, or a method for recognizing patterns, in which a pattern recognizer has plural different discriminant functions by which a candidate is assigned to an unknown pattern, and one of the plural different discriminant functions is selected in accordance with a characteristic of the unknown pattern. The characteristics by which one of the different discriminant functions is selected may include font size, font type and image quality, and the different discriminant functions may include a Mahalanobis distance function, a mean square distance function and a mean absolute distance function.

In another aspect, the invention is a pattern recognition apparatus, or a method for recognizing unknown patterns, in which a pattern recognizer includes first and second dictionaries of known patterns, and in which one of the first and second dictionaries is selected based on the quality of the unknown pattern to be recognized.

The pattern recognition apparatus and pattern recognition method of the present invention may be provided in a stand-alone form including an image input device and a character recognition device in one integrated device and this device may be provided with an interface to a local area network bus. Alternatively, the pattern recognition apparatus may be distributed such that an image input device and a character recognition device are provided with individual servers on a local area network bus for interface with plural stand-alone computers.

This brief summary of the invention has been provided so that the nature of the invention may be understood quickly. A more complete understanding of the invention may be obtained by reference to the following detailed description in connection with the appended drawings.

BRIEF DESCRIPTION OF THE DRAWINGS

FIG. 12, comprising

DETAILED DESCRIPTION OF THE PREFERRED EMBODIMENT

Figure 1:
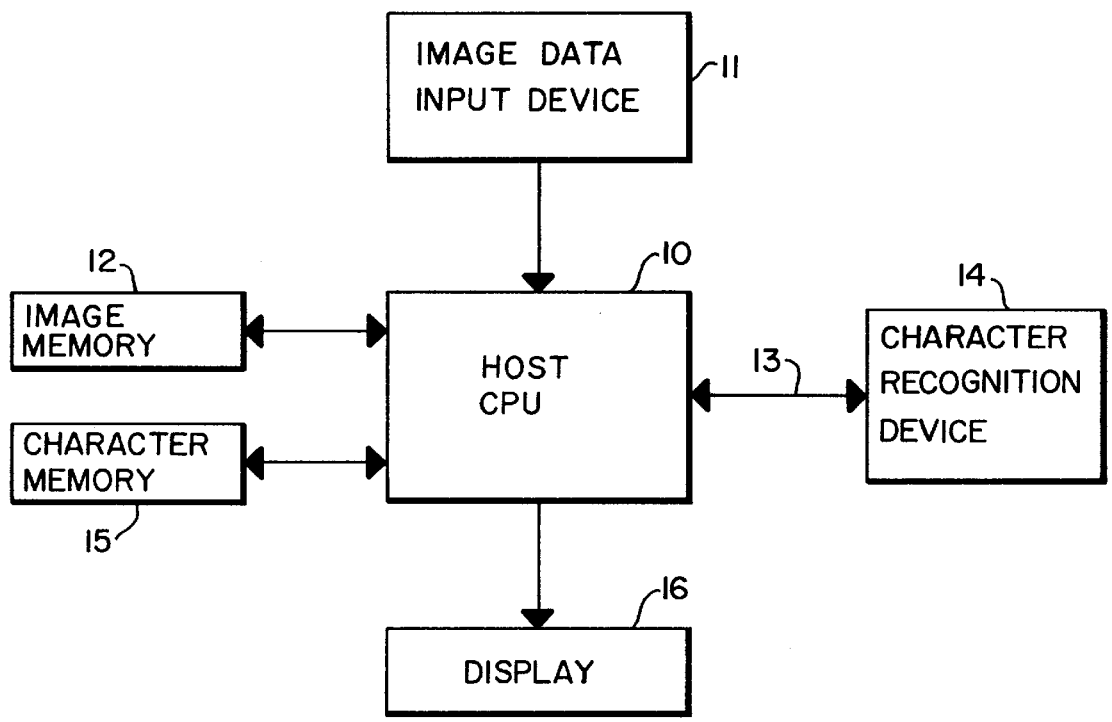
FIG. 1 is an overall block diagram of a pattern recognition apparatus according to the present invention.

FIG. 1 is an overall block diagram of a pattern recognition apparatus according to the present invention.

As shown in FIG. 1, the pattern recognition system includes a host CPU 10 such as an EZPS3500 programmable microprocessor, an image data input device 11 such as an image scanner or facsimile reception unit, an image memory 12 for storing image data input by the input device, a character recognition device 14 for recognizing unknown patterns transferred by host CPU 10 over SCSI interface 13 and transferring candidates for the unknown pattern back to the host CPU over interface 13, a character memory 15 for storing the candidates transmitted from the character recognition device, and a display 16 for displaying the pattern recognition results.

Figure 2:
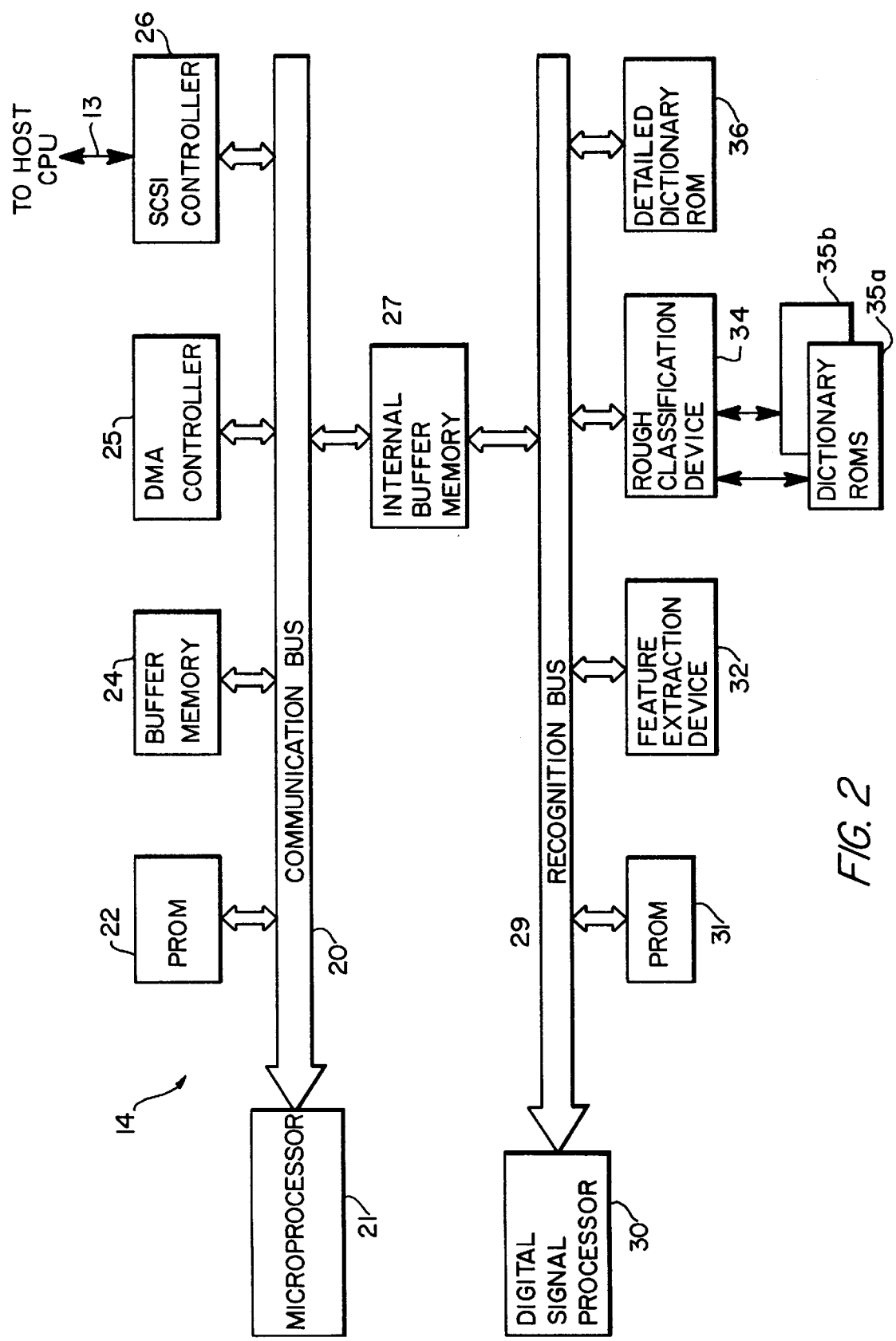
FIG. 2 is a detailed block diagram of the optical character recognition device depicted in FIG. 1.

FIG. 2 is a detailed block diagram of character recognition device 14.

As shown in FIG. 2, character recognition device 14 is comprised by a communication part and a recognition part. The communication part includes a communication bus 20 to which are connected a microprocessor 21 such as a 68000 programmable microprocessor, a programmable read only memory ("PROM") 22 for storing process steps for execution by microprocessor 21, a buffer memory 24 for buffering communication to and from host CPU 10, a DMA controller 25 for controlling direct memory access with host CPU 10, an SCSI controller 26 for communication with host CPU 10 over interface 13, and an internal buffer memory 27 for providing internal buffering between the communication part and the recognition part. The recognition part includes a recognition bus 29 to which are connected the aforementioned internal buffer memory 27 as well as a digital signal processor ("DSP") 30 such as a TMS320C25 Texas Instruments digital signal processor, a PROM 31 for storing process steps to be executed by DSP 30, a feature extraction device for extracting a feature vector from an unknown pattern, a rough classification device 34 for providing plural candidates selected from dictionary ROMs 35a and 35b for an unknown pattern, and a detailed dictionary ROM 36 for providing detailed dictionary data by which the rough classification candidates are narrowed and provided to host CPU 10 for post processing.

Figure 3:
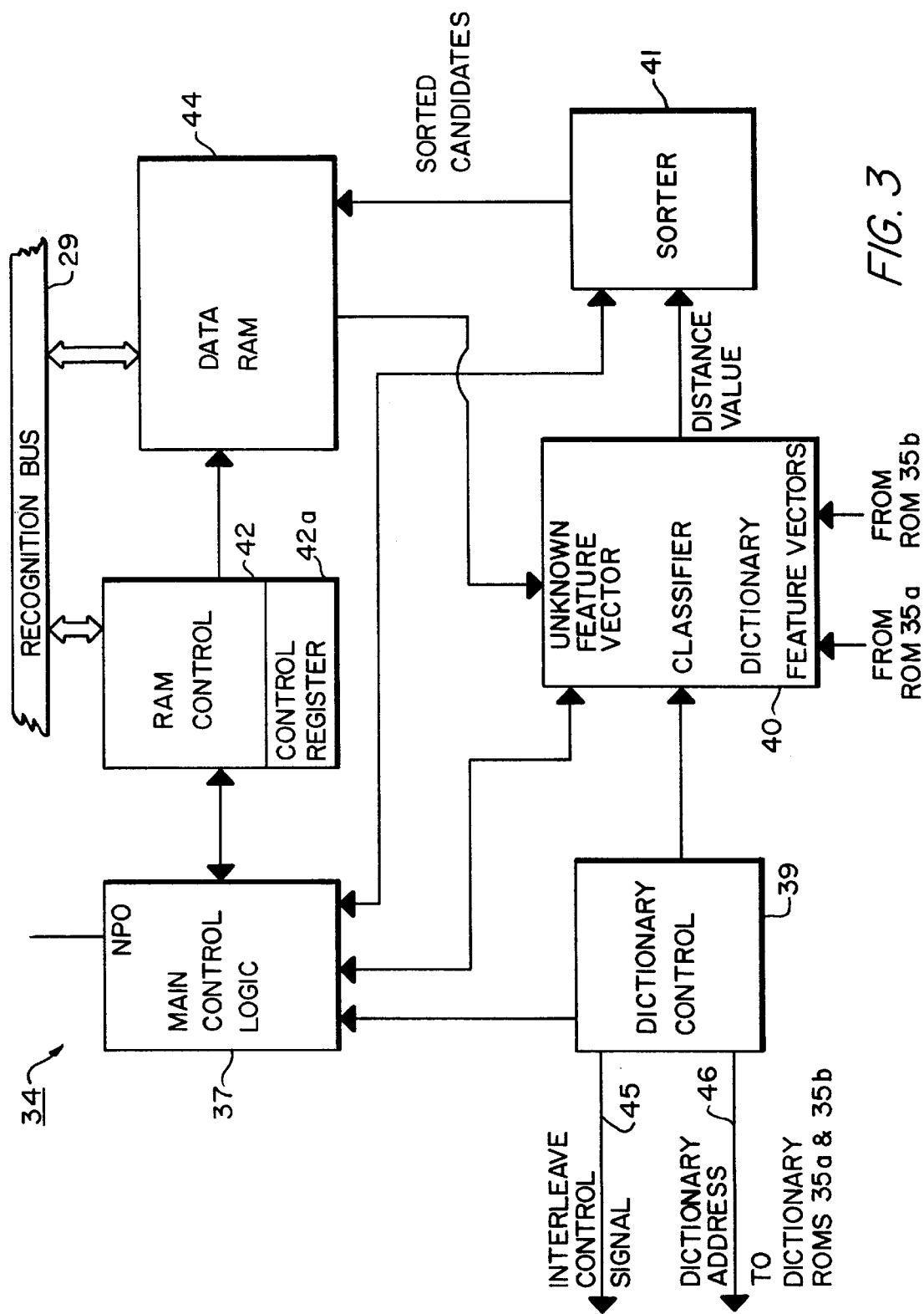
FIG. 3 is a detailed block diagram of the rough classification device depicted in FIG. 2.

FIG. 3 is a detailed block diagram of rough classification device 34.

As shown in FIG. 3, rough classification device 34 includes main control logic 37 for controlling the various components within the rough classification device. In particular, main control logic 37 controls dictionary control 39, classifier 40, sorter 41 and RAM control 42 which, in turn, controls data RAM 44. Main control logic 37 also asserts a "new proposed output" flag ("NPO") to DSP 30 when a new output is available.

In more detail, dictionary control 39 provides control for dictionary ROMs 35a and 35b. As shown in FIG. 3, dictionary control 39 provides an interleave control signal 45 and a dictionary address signal 46. These signals permit reading dictionary ROMs 35a and 35b in parallel so as to provide feature vectors in the dictionary to classifier 40 at a higher rate than if the dictionary ROMs were read one at a time. If desired, these signals can be used to read more than two dictionary ROMs, although this is not shown.

Classifier 40 includes two arithmetic units (one for each dictionary ROM) for calculating the distance between a dictionary feature vector and the feature vector for the unknown pattern. Under control from main control logic 37, classifier 40 calculates the distance in accordance with one of three distance functions, namely the Mahalanobis distance function, the mean absolute value distance function, and the mean square distance function. In more detail, the Mahalanobis distance function calculates the dot product of the feature vector X of the unknown pattern and the feature vector W from the dictionary ROM as follows:

$$\sum_{k=0}^{kmax} (X_k * Z_k) \quad (1)$$

where kmax is the dimensionality of the feature vector, $Z=-2C^{-1}W$ (C is average covariance matrix of the dictionary vectors), $X_0=1$, and $W_0=W^T C^{-1} W$.

The mean absolute distance function sums all of the absolute distances between the feature vector of the unknown pattern and the feature vector from the dictionary ROM as follows:

$$\sum_{k=1}^{kmax} |X_k - W_k| \quad (2)$$

The mean square distance function sums the square of the distance between the feature vector of the unknown pattern and the feature vector from the dictionary ROM as follows:

$$\sum_{k=1}^{kmax} (X_k - W_k)^2 \quad (3)$$

The distance value so calculated, together with the identity of the candidate that corresponds to the distance value, is provided to sorter 41. Sorter 41 sorts the distance values provided from classifier 40 into ascending or descending order in accordance with a control signal from main control logic 37. A sorter suitable for use as sorter 41 is described in detail in application Ser. No. 07/554,384 filed Jul. 19, 1990 by the inventor of the present application. The contents of application Ser. No. 07/554,384 are hereby incorporated by reference as if set forth in full herein.

When classifier 40 has processed each feature vector in dictionary ROMs 35a and 35b, main control logic 37 causes sorter 41 to transmit sorted distance values and corresponding candidate identities to data RAM 44. Under the control of RAM 42 and main control logic 37, data RAM 44 stores the sorted distance values and the corresponding candidate identities in sequential storage locations. To conserve storage space in data RAM 44, it is preferable for the data RAM to store only one of the distance values or the candidate identities, and this election is made in accordance with control from RAM control 42.

Figure 4:
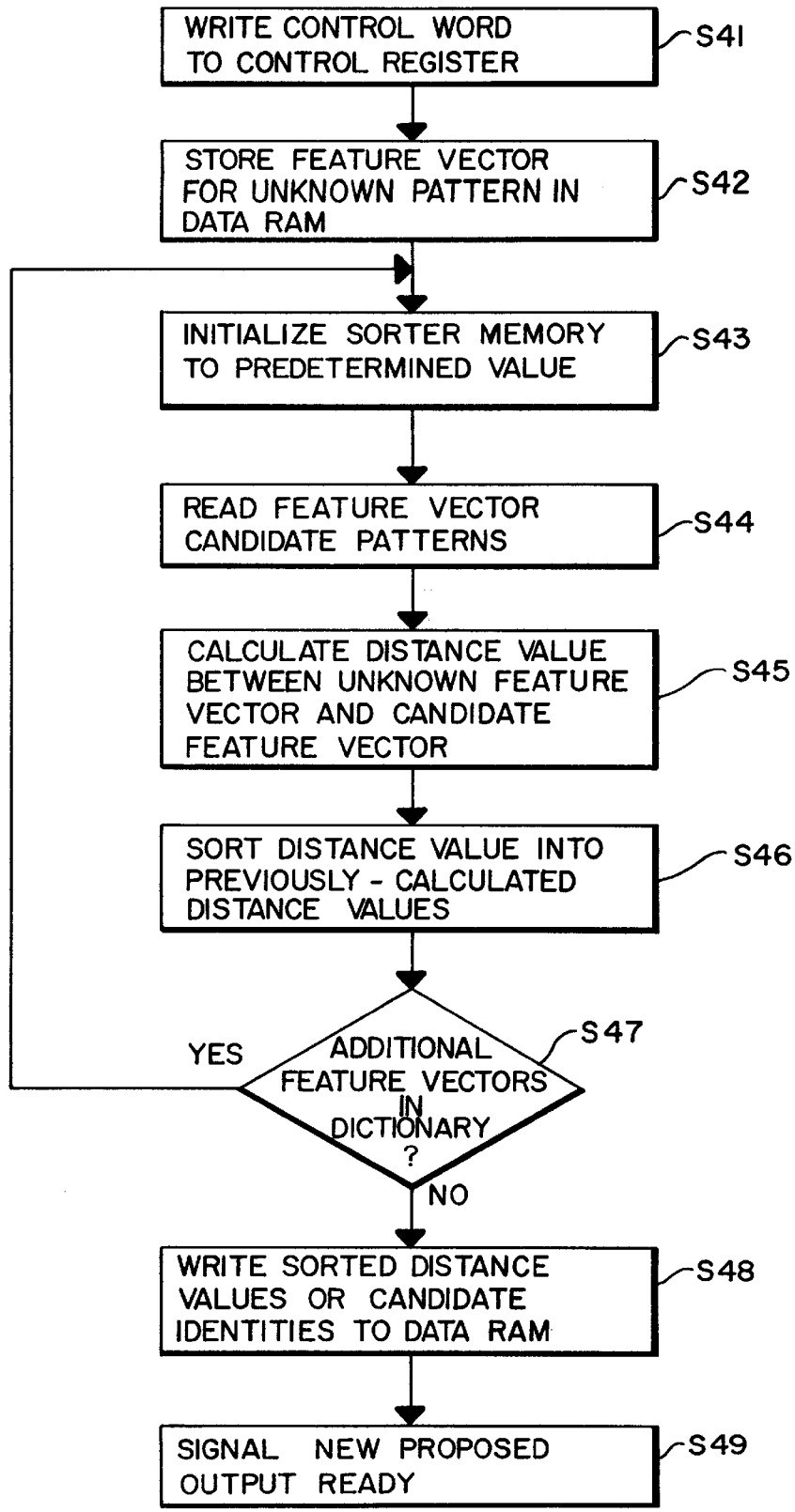
FIG. 4 is a flow chart for describing the operation of the rough classifier shown in FIG. 3.

FIG. 4 is a flow chart for explaining the operation of rough classification device 34.

Figure 5:
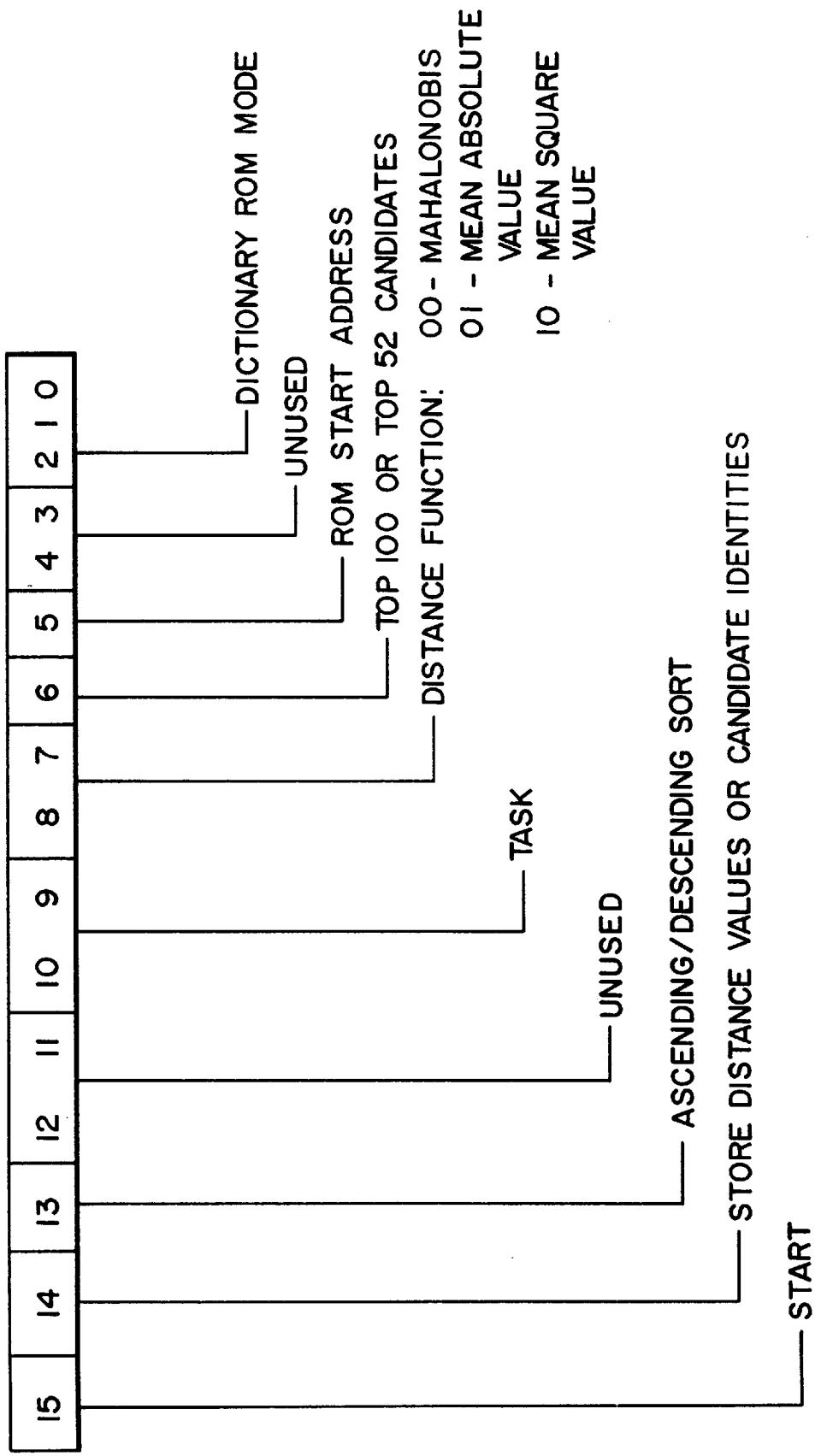
FIG. 5 is a diagram for explaining a control word used in the rough classifier of FIG. 3.

In step S41, DSP 30 writes a control word to control register 42a in RAM control 42. Bit assignments for the control word are shown in FIG. 5. As shown there, bit 15 is a start bit for instructing the rough classification device 34 to begin its classification and/or sorting tasks. Bit 14 is a tag bit used to instruct the device whether to store the distance values from sorter 41 in data RAM 44 or to store the candidate identities from sorter 41. Bit 13 indicates whether to sort in ascending or descending order. Bits 9 and 10 indicate whether the rough classification device simply calculates distance values without sorting, simply sorts data in data RAM 44, or both calculates distance values and sorts the calculated distance values. Bits 7 and 8 specify which one of the distance functions will be utilized by classifier 40, namely the above-mentioned Mahalanobis distance function, the mean absolute value distance function or the mean square value distance function. Bit 6 indicates whether to store the top 100 or the top 52 candidates in data RAM 44. Bit 5 indicates where to begin accessing data in dictionary ROMs 35*a* and 35*b*. If bit 5 is set to 1, the dictionary ROMs are accessed from the beginning thereof; on the other hand, if bit 5 is set to 0 then the dictionary ROMs are accessed beginning with the last access address. Bits 0, 1 and 2 indicate the dictionary ROM mode, that is, the number of dictionary ROMs provided in the device and the interleave coordination for these dictionary ROMs.

Reverting to FIG. 4, in step S42, DSP 30 puts the feature vector for the unknown pattern onto recognition bus 29 and RAM control 42 stores the feature vector in sequential locations in data RAM 44. In step S43, sorter memory 41 is initialized to a predetermined value in preparation for sorting operations. As described in application Ser. No. 07/554,384 now U.S. Pat. No. 5,303,381, the predetermined value may be the maximum expected distance value or the minimum expected distance value in accordance with whether an ascending or descending sort is desired. As described more fully in connection with application Ser. No. 07/832,594 entitled "Method And Apparatus For Pattern Recognition" filed on Feb. 7, 1992 by the same inventor herein, other initialization values may be used.

In step S44, in accordance with start bit 15, data RAM 44 provides the feature vector of the unknown pattern to classifier 40. Dictionary control 39 then accesses dictionary ROMs 35*a* and 35*b* in the sequence designated by ROM start address bit 5 and causes the feature vectors corresponding to the candidate patterns in the dictionary ROMs also to be provided to classifier 40. In case of the Mahalanobis function, the dictionary feature vector W must be pre-processed as shown above for equation (1). Alternatively, though not shown, a separate dictionary may be provided solely for use when the Mahalanobis function is selected. The separate dictionary would contain feature vectors that are pre-processed according to equation (1) and that can be used directly with the unknown feature vector.

In step S45, classifier 40 calculates the distance value between the unknown feature vector and the candidate feature vector. The distance function used to calculate the distance value is selected in accordance with bits 7 and 8 of the control word stored in control register 42*a*. In step S46 the newly calculated distance value is provided to sorter 41. Sorter 41 sorts the new distance value into previously-calculated distance values as described in the aforementioned U.S. application Ser. No. 07/554,384 now U.S. Pat. No. 5,303,381. The sort is conducted utilizing the top 100 or the top 52 candidates in accordance with bit 6 of the control word stored in control register 42*a*, and is conducted in ascending or descending order in accordance with bit 13.

If there are additional feature vectors stored in dictionary ROMs 35*a* and 35*b*, then in step S47 control returns to step S43. On the other hand, if all feature vectors have been processed, then flow proceeds to step S48 in which the sorted distance values together with the sorted candidate identities are provided to data RAM 44. RAM 44 stores either the distance values or the candidate identities in accordance with bit 14 of the control word stored in control register 42*a*. The data are written in sequential locations of data RAM 44 and overwrite the data for the unknown feature vector that was stored in step S42.

In step S49 the rough classification device 34 raises an NPO flag (see FIG. 3) to signal DSP 30 that new proposed output is ready. Digital signal processor 30 reads data RAM 44 via recognition bus 29 and processes the sorted data as described in more detail below.

Figure 6:
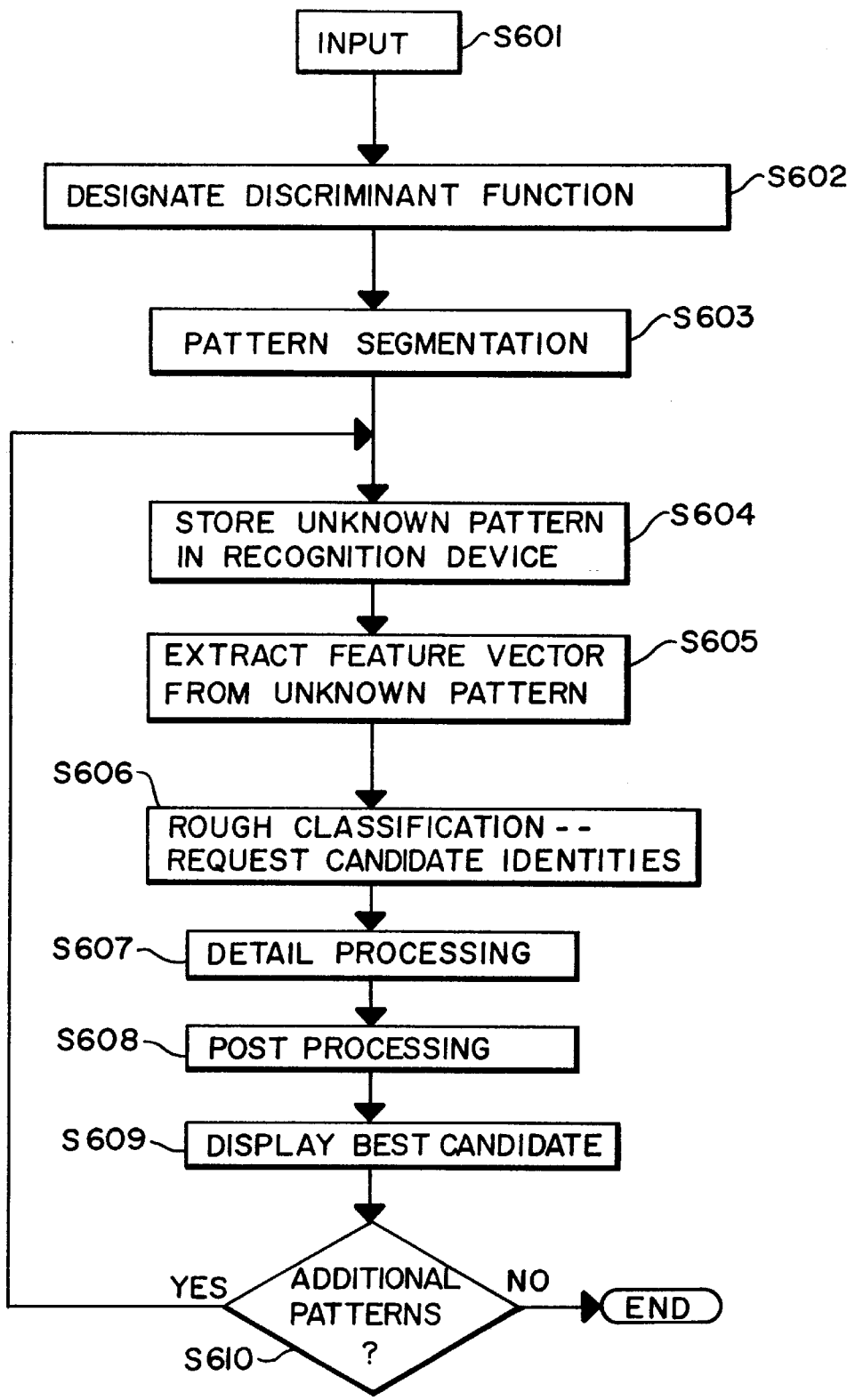
FIGS. 6 and 7 are flow charts for explaining pattern recognition according to the invention.

FIG. 6 is a flow chart for explaining the operation of the pattern recognition apparatus shown in FIGS. 1, 2 and 3. The process steps illustrated in FIG. 6 are stored in the form of computer programs in an unshown memory for host CPU 10, in PROM 22 for microprocessor 21 and in PROM 31 for DSP 30, and executed by host CPU 10, microprocessor 21, and digital signal processor 30, respectively, as will be evident from the following description.

In the operation depicted in FIG. 6, one of plural different recognition modes for recognizing an unknown pattern are selected in accordance with the characteristics of the unknown pattern. In particular, the discriminant function by which the pattern is recognized is selected in accordance with the characteristics of the pattern. In the case where the pattern to be recognized is a character pattern, the image characteristics include the image quality, the font and the size of the type face.

Thus, in step S601, image data is input from input device 11 into host CPU 10. Host CPU 10 stores the image data in image memory 12.

In step S602, the discriminant function by which the unknown pattern is to be recognized is manually designated via operator interface on host CPU 10 and transferred to character recognition device 14 on interface 13. The designation is made in dependence upon the image quality, the type of font, and the size of the type face.

Table 1 shows discriminant functions that have been found to provide reliable character recognition results based on image quality, font type and size of type face. Thus, as shown in Table 1, for good images of large size typeface, the mean absolute distance discriminant function should be designated in step S602. On the other hand, for degraded images of small size type face, the Mahalanobis discriminant function should be designated in step S602. Intermediate these two extremes, the particular discriminant function that should be designated in step S602 is manually selected via operator interface on host CPU 10 in accordance with the image quality, the font type and the size of the type face as shown in Table 1. In situations such as that shown for 9-point standard font characters of good image quality, the entry "MSD/MAD" indicates that both the mean square distance function and the mean absolute distance function provide reliable character recognition results, and either discriminant function may be designated in step S602.

In step S603, host CPU 10 segments the image into individual patterns and sequentially transfers the segmented pattern to character recognition device 14 via interface 13.

In step S604, character recognition device 14 accepts an unknown pattern via SCSI controller 26 and stores the unknown pattern in buffer memory 24. Buffer memory 24 is controlled by microprocessor 21 such that it stores patterns transmitted from host CPU 10 so as to provide a continuous stream of patterns to recognition bus 29. The interface

TABLE 1

| | | Image Quality | | | | | | | |
|---|---|---|---|---|---|---|---|---|---|
| | | Good | | | | Degraded | | | |
| | Font | Standard | Italic | Bold | Bold Italic | Standard | Italic | Bold | Bold Italic |
| FONT SIZE | 6 point | Mahal | Mahal | Mahal | Mahal | Mahal | Mahal | Mahal | Mahal |
| | 8 point | Mahal | Mahal | Mahal | Mahal | Mahal | Mahal | Mahal | Mahal |
| | 9 point | MSD/MAD | MSD/MAD | Mahal | Mahal | Mahal | Mahal | Mahal | Mahal |
| | 10 point | MAD | MAD | MSD/MAD | MSD/MAD | MSD/MAD | MSD/MAD | Mahal | Mahal |
| | 12 point | MAD | MAD | MAD | MAD | MAD | MAD | Mahal | Mahal |

Mahal = Mahalanobis distance function
MSD = mean square distance function
MAD = mean absolute distance function between the communication bus 20 and recognition bus 29 is provided by internal buffer memory 27.

In step S605, the unknown pattern, which has been transmitted to the recognition bus 29 via internal buffer memory 27, is transmitted by digital signal processor 30 to feature extraction device 32. As is known, feature extraction device 32 determines a feature vector from the unknown pattern in which each component of the vector represents a different feature of the unknown pattern such as stroke position, direction, length, and so forth. Typically, up to about 200 different features are extracted for each unknown pattern.

In step S606, digital signal processor 30 writes a control word to the control register of rough classification device 34 that commands the rough classification device to return sorted candidate identities rather than sorted distance values (i.e., bit 14 is set to "zero"). A subset of the feature vector determined in step S605 is transmitted to the data RAM 44 in the rough classification device. The start bit is set in the rough classification device to command the rough classification device to compare the feature vector of the unknown pattern to the feature vectors stored in dictionary ROMs 35a and 35b as described above with respect to FIG. 4.

In step S607, upon detection of the NPO signal from rough classification device 34, the sorted candidate identities are subjected to detail processing whereby the full feature vector extracted in step S605 is compared to full feature vectors stored in detailed dictionary ROM 36. For this detailed processing, other discriminant functions, such as a pseudo-bayesian discriminant function, may be used in addition to or in place of the Mahalanobis distance function or the mean square value distance function or the mean absolute value distance function. In the pseudo-bayesian discriminant function method, the first k elements of the feature vector are used for distance calculation. Then, by assuming that the mean value of the remaining elements is h, and by using h instead of the remaining elements, distance is calculated. Such a method permits distance calculation for large feature vectors in short amounts of time. Moreover, because of the rough classification performed in step S606 there is no need to calculate distance functions for each of the entries in detailed dictionary ROM 36; rather, only the candidate identities returned in the rough classification step need be examined.

The candidate identities that are determined to be the best for the unknown pattern in detail processing step S607 are transmitted from the recognition bus 29 to the communication bus 20 via internal buffer memory 27, and thence to host CPU 10 via buffer memory 24 and SCSI controller 26 over interface 13. In step S608, host CPU 10 performs post-processing on the candidate identities to assign an identity to the unknown pattern. In particular, post-processing may consist of spell checking, syntax checking, context checking (for example, rejecting letters that are embedded in numbers or vice versa), and so on. The identity assigned to the unknown pattern is stored in character memory 15 and displayed on display 16 (step S609).

In step S610 it is determined whether there are additional unknown patterns for which identities are required. If there are additional patterns, then flow returns to step S604; on the other hand, if there are no additional patterns then operation terminates.

Figure 7A:
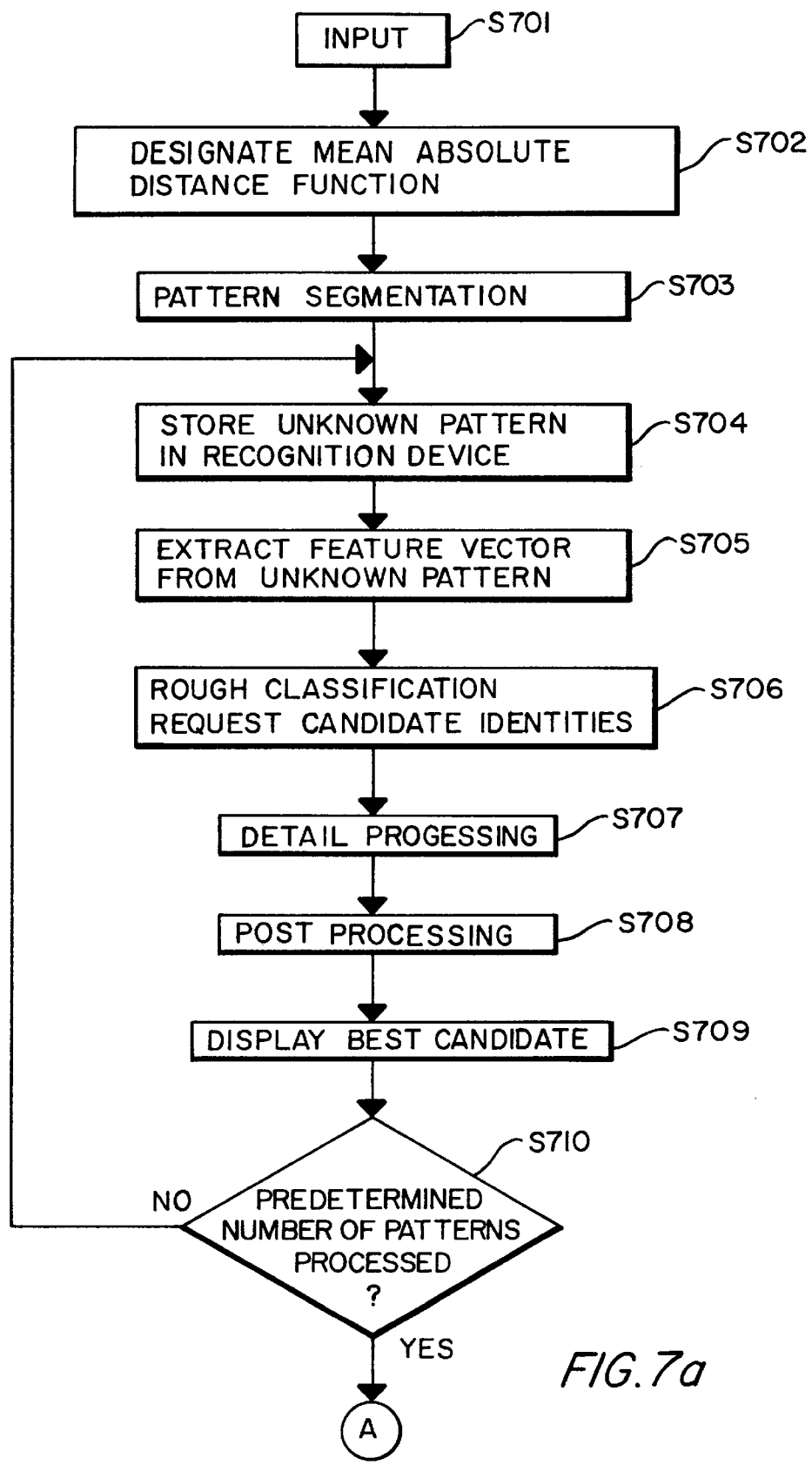

FIG. 7 is a flow chart showing a second operational mode for the pattern recognition device shown in FIGS. 1, 2 and 3, and in which the discriminant function used for pattern recognition is selected in accordance with image characteristics. In FIG. 7, the image characteristics are inferred based on the number of rejects (that is, the number of unrecognizable characters) encountered during pattern recognition.

Thus, in step S701, image data is input from input device 11 into host CPU 10 which stores the image data in image memory 12. In step S702, the mean absolute distance function is designated in preparation for character recognition.

Steps S703 through S708 are substantially similar to steps S603 through step S609, respectively, and a detailed description thereof is omitted. In step S709, the identity assigned to the unknown pattern is stored in character memory 15 by host CPU 10.

In step S710, host CPU 10 determines whether a predetermined number of patterns have been subjected to pattern recognition. In the case of character recognition, the number of predetermined characters corresponds to about one page of character information. If a predetermined number of patterns have not yet been processed, then flow returns to step S704 until a predetermined number of patterns have been subjected to pattern recognition.

When a predetermined number of patterns have been subjected to pattern recognition, then flow advances to step S711 in which CPU 10 counts the number of rejects encountered during pattern recognition. A reject may be identified by, for example, the techniques described in the above-referenced U.S. application entitled "Method And Apparatus For Pattern Recognition".

In step S712, if the number of rejects are greater than a predetermined level, then it is considered that the image characteristics are such that the mean absolute distance function is not suitable for pattern recognition. Accordingly, flow advances to step S713 in which the mean square distance function is designated and pattern recognition is repeated for the predetermined number of patterns that were processed in steps S703 through S708 (step S714).

In step S715, the number of rejects are again counted and in step S716, if the number of rejects are greater than a predetermined number then it is then considered that the image quality is such that the mean square distance function is not suitable for pattern recognition. Accordingly, the Mahalanobis distance function is designated for pattern recognition (step S717), and pattern recognition is repeated for the predetermined number of patterns that were processed in step S714 (step S718).

When the number of rejects is not greater than a predetermined number (or after the Mahalanobis distance function has been designated), flow advances to step S719 where it is determined if there are additional unknown patterns for which identities are required. If there are additional patterns, then flow advances to step S720 in which the pattern recognition process is continued with the discriminant function previously designated, that is, the discriminant function designated in step S702, S713, or step S717. On the other hand, if there are no additional patterns, then operation terminates.

Figure 8:
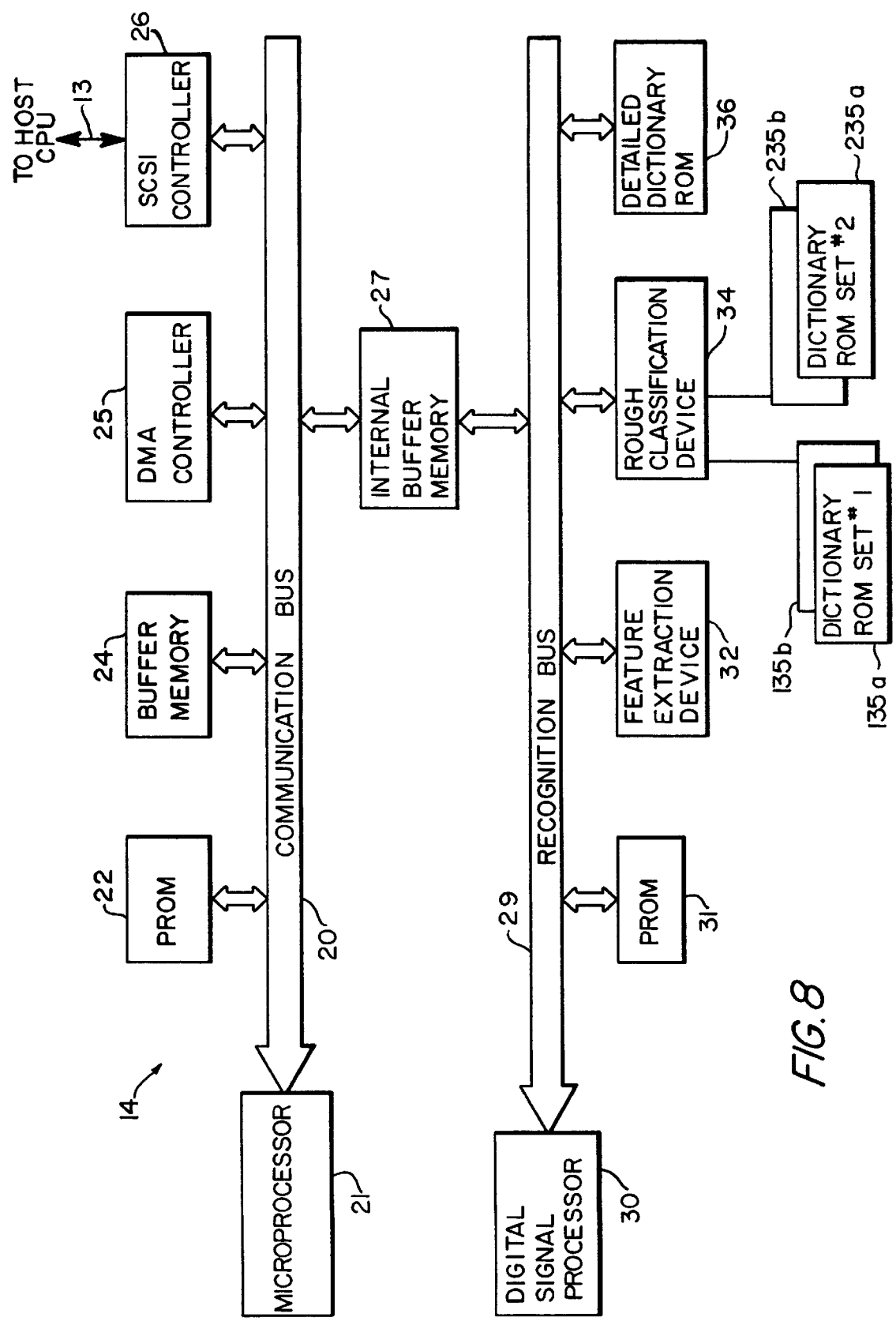
FIG. 8 is a modification of the FIG. 2 character recognition device used for explaining another embodiment of the invention.

FIG. 8 is a block diagram showing a modification to the pattern recognition device shown in FIG. 2. In the FIG. 8 block diagram, rough classification device 34 is provided with two different sets of dictionary ROMs. Dictionary ROM set 135a and 135b provides a dictionary of feature vectors that are suitable for images of good quality, whereas dictionary ROM set 235a and 235b provides dictionary vectors that are suitable when image quality is degraded. Which one of the two dictionary ROM sets used during pattern recognition is controlled in accordance with bits 2 through 0 in the control word shown in FIG. 5 and stored in control register 42a, and these bits are set as described more fully below.

Figure 9:
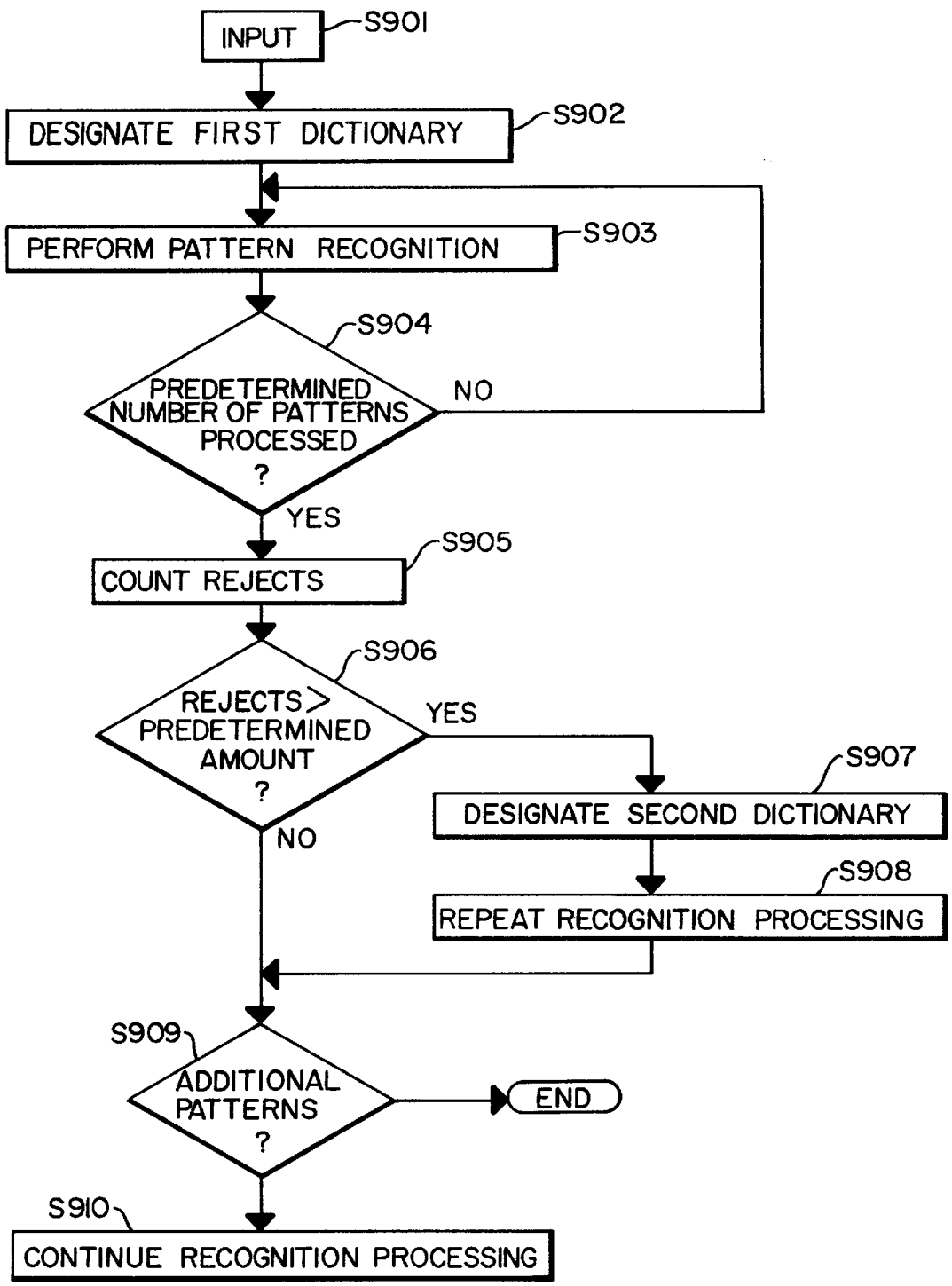
FIG. 9 is a flow chart for explaining the operation of the FIG. 8 embodiment.

FIG. 9 is a flow chart for explaining operation of the FIG. 8 apparatus.

In step S901, image data is input from input device 11 into host CPU 10 which stores the image data in image memory 12. In step S902, a control word is written to control register 42a so as to designate dictionary set 135a and 135b, namely dictionary ROMs containing feature vectors suitable for recognizing good quality images.

In step S903, pattern recognition is performed, for example, as explained above with reference to steps S603 through S609, but by reference to dictionary ROM set 135a and 135b, as described above.

In step S904, it is determined whether recognition has been performed for a predetermined number of patterns, for example, a number of characters corresponding to a page of character information. If not, flow returns to step S903 until a predetermined number of characters have been recognition-processed.

When a predetermined number of characters have been recognition-processed, flow advances to step S905 where CPU 10 counts the number of reject characters (that is, the number of patterns which are unrecognizable) which have been encountered. Reject processing can be conducted in accordance with the aforementioned application entitled Method And Apparatus For Pattern Recognition filed on even date herewith by the present inventor.

In step S906, if the number of rejects are greater than the predetermined number, then flow advances to step S907 in which dictionary ROM set 235a and 235b are designated. Specifically, if the number of rejects are greater than a predetermined number, then it is considered that the characteristics of the pattern to be recognized are such that dictionary ROMs for good quality images are unsuitable and that the image characteristics must correspond to that of a degraded image. In step S908, recognition is repeated for the predetermined number of characters whereupon flow advances to step S909. In step S909, it is determined whether there are additional characters that require character recognition. If there are additional characters, then flow advances to step S910 where character recognition is performed using the dictionary ROM set previously designated. If there are no additional characters for processing, then flow terminates.

Figure 10:
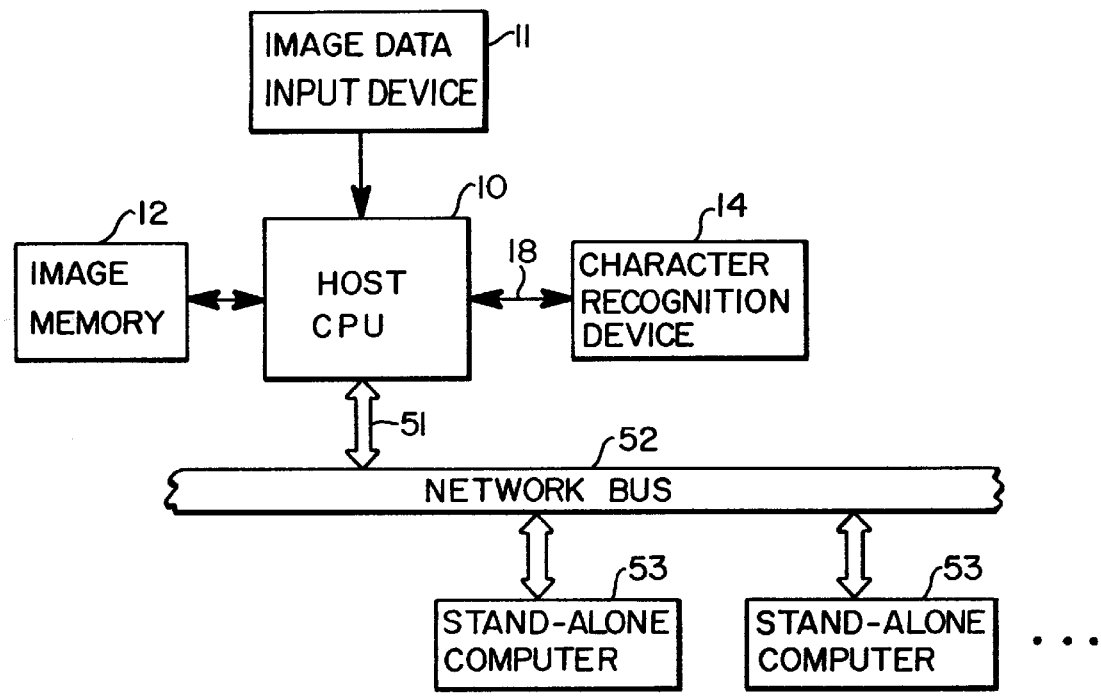
FIGS. 10 and 11 are block diagrams for showing alternative embodiments of a pattern recognition apparatus according to the invention.

FIG. 10 illustrates a further embodiment of a pattern recognition apparatus according to the present invention. In FIG. 10, components having functions similar to those described above have been assigned the same reference numerals.

In the pattern recognition apparatus of FIG. 10, a host CPU 10 obtains image data from an image data input device 11 and stores the image data in image memory 12. The image data in image memory is segmented by CPU 10 into individual unknown patterns which are transmitted to character recognition apparatus 14 via interface 13. Character recognition device 14 performs feature extraction to obtain a feature vector for the unknown pattern, performs rough classification based on the feature vector, and detailed classification based on the results of the rough classification, all as described hereinabove in connection with FIGS. 1 to 9. The identities of the candidates from detail processing are transmitted back to host CPU 10 via bus 13, whereupon host CPU performs post-processing to assign an identity to the unknown pattern.

The identities assigned to the unknown patterns are transmitted via bus 51 to local area network bus 52. Local area network bus 52 is accessed by plural stand alone computers 53 whereby each of the stand alone computers can avail itself of the pattern recognition capabilities of the recognition apparatus.

The operation of the embodiment shown in FIG. 10 is identical in all other respects to the operation of the embodiments above.

Figure 11:
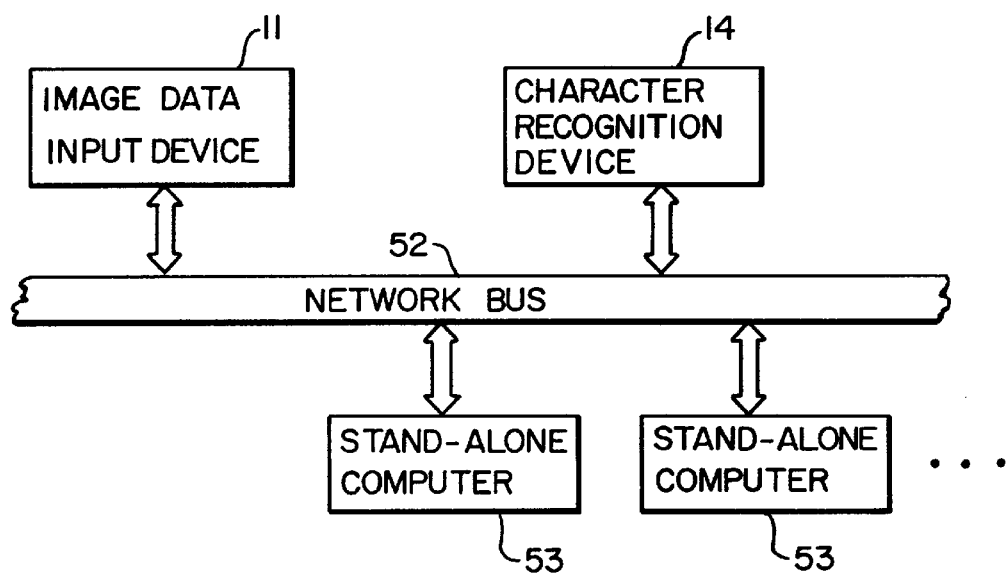

FIG. 11 illustrates another embodiment of the pattern recognition apparatus according to the present invention. In FIG. 11, elements having functions and structures similar to those described above have been assigned the same reference numerals.

As shown in FIG. 11, local area network bus 52 is provided with an image data input device 11, a character recognition device 14 and plural stand alone computers 53. With this structure, each of stand alone computers 53 is able to access the image data input capabilities of image data input device 11 and to channel the image data so received to character recognition device 14 so as to obtain the identities of candidates for unknown patterns. This structure eliminates the necessity of providing a host CPU and an image memory; the processes performed by host CPU 10 and image memory 12 in the previous embodiments can be performed by the stand alone computers 53.

Figure 12A:
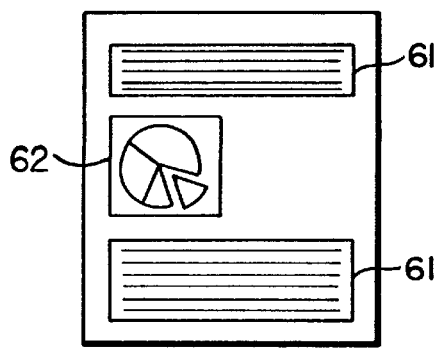
FIGS. 12(a) and 12(b), are views for explaining examples of pattern recognition according to the present invention.
Figure 12B:
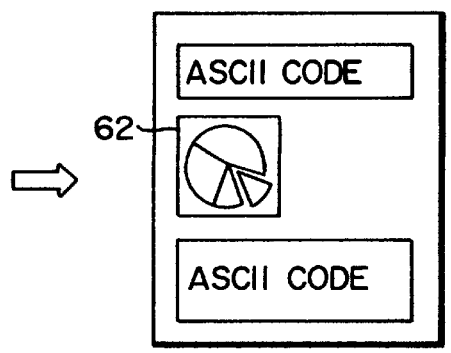
Figure 13:
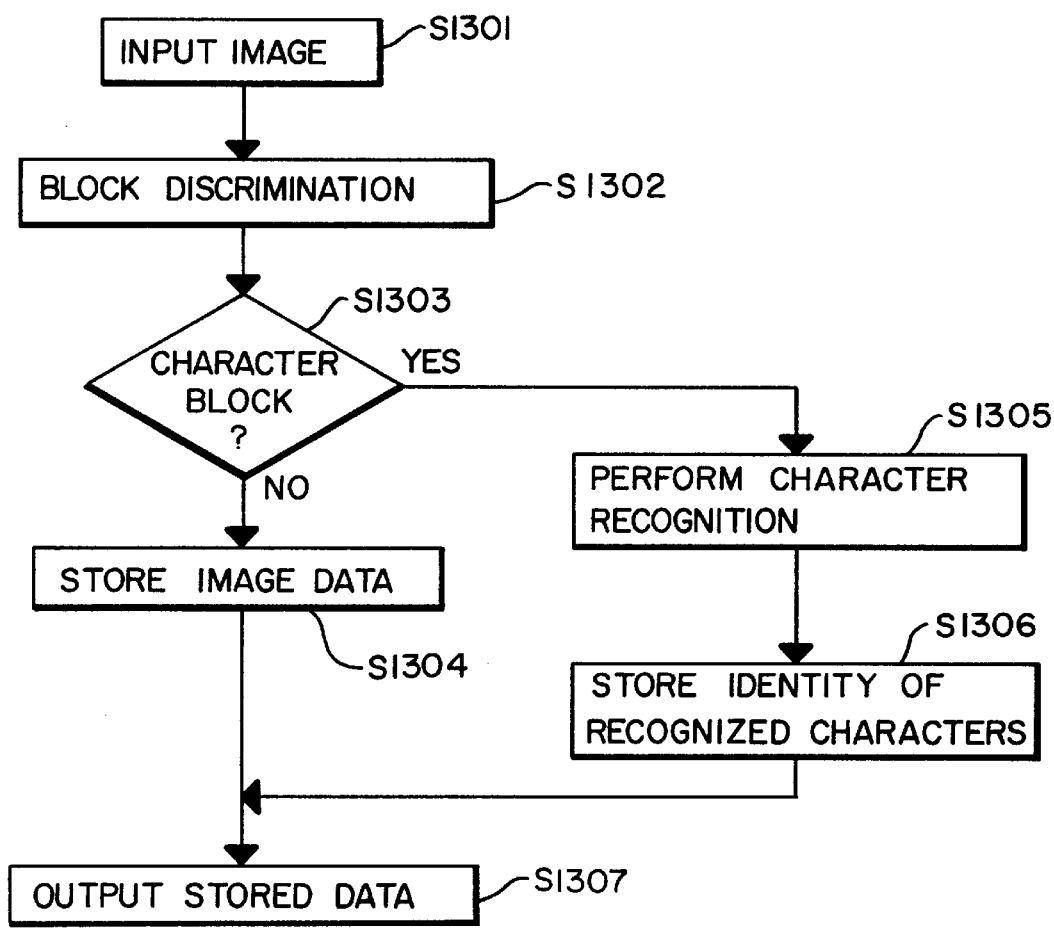
FIG. 13 is a flow chart used for explaining pattern recognition according to FIG. 12.

FIGS. 12 and 13 are views for explaining operation of any of the foregoing embodiments in the case where the image data input by input device 11 contains image data representing characters mixed with image data representing images. In particular, as shown in FIG. 12(a), image data typically contains areas 61 representing images of characters or text data as well as areas 62 representing non-character image data, for example, graphs, pictures, charts and the like. For such an image, it is advantageous to distinguish between the character areas 61 and the non-character areas 62, to perform character recognition on the character areas 61, and to store a representation of the input image such that character areas are decoded into the identity of the characters whereas the image areas are retained as image information, for example, as shown in FIG. 12(b).

FIG. 13 is a flow chart illustrating this mode of operation. In step S1301, image data is input. The image data is inspected to identify individual blocks of information and each individual block of information is discriminated as to whether the block contains character information or non-character information (step S1302). Such discrimination is known in the art, for example, as described in U.S. Pat. Nos. 4,701,807 and 4,729,035.

Step S1303 determines whether a character block has been discriminated in step S1302. If a character block has not been discriminated then in step S1304 the image data is stored without processing. On the other hand, if a character block has been discriminated, then in step S1305 character recognition processing is performed in accordance with any of the techniques described above. In step S1306 the identity of recognized characters are stored.

In step S1307, the stored data, whether image or character, is output. In this regard, the stored data may be output via a modem to a telephone interface. In this case, character data is output in code form, for example, ASCII code, while image data is output in image form, for example, in accordance with the CCITT standards for G3 facsimile transmission.

Figure 14:
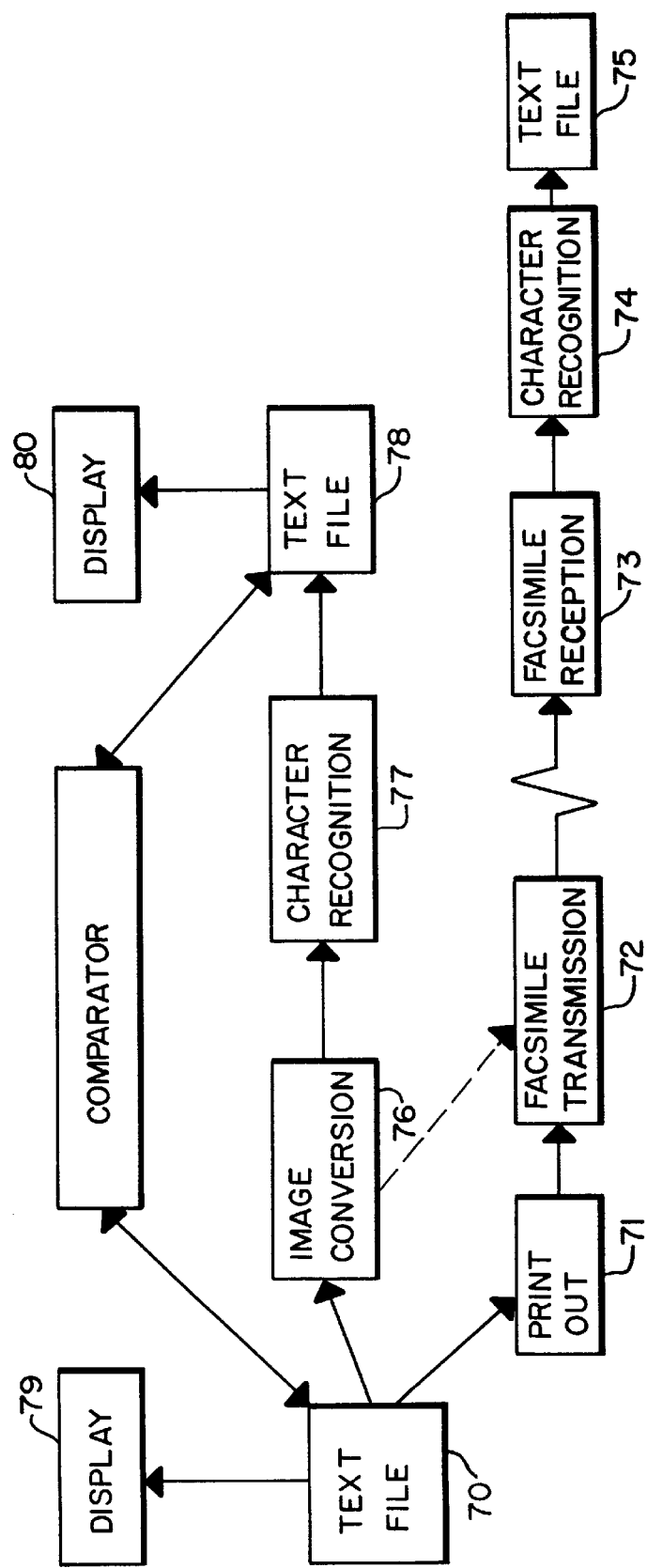
FIG. 14 is a functional block diagram for explaining another pattern recognition system according to the invention.
Figure 15:
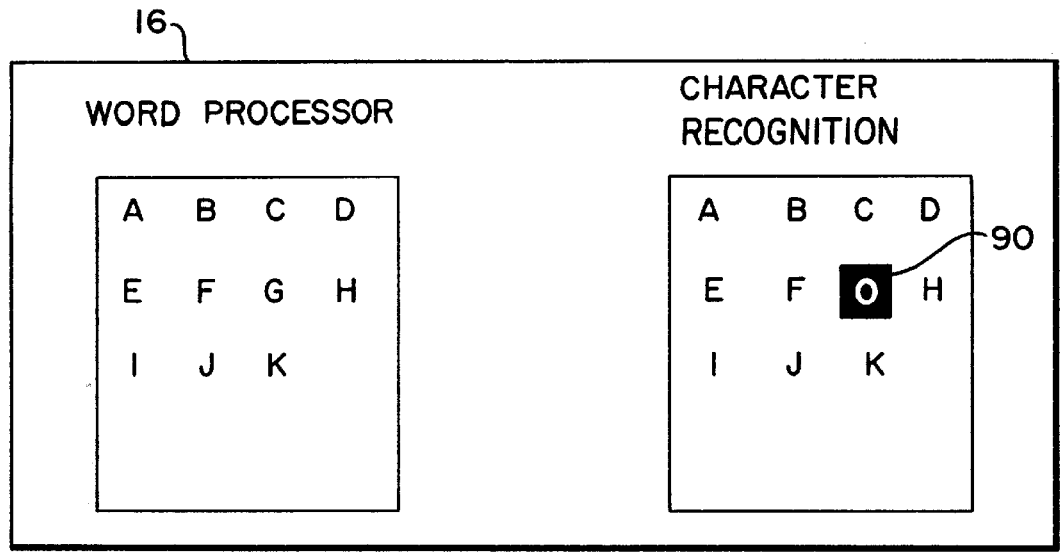
FIG. 15 is a view for showing a pattern recognition result according to the FIG. 14 system.
Figure 16:
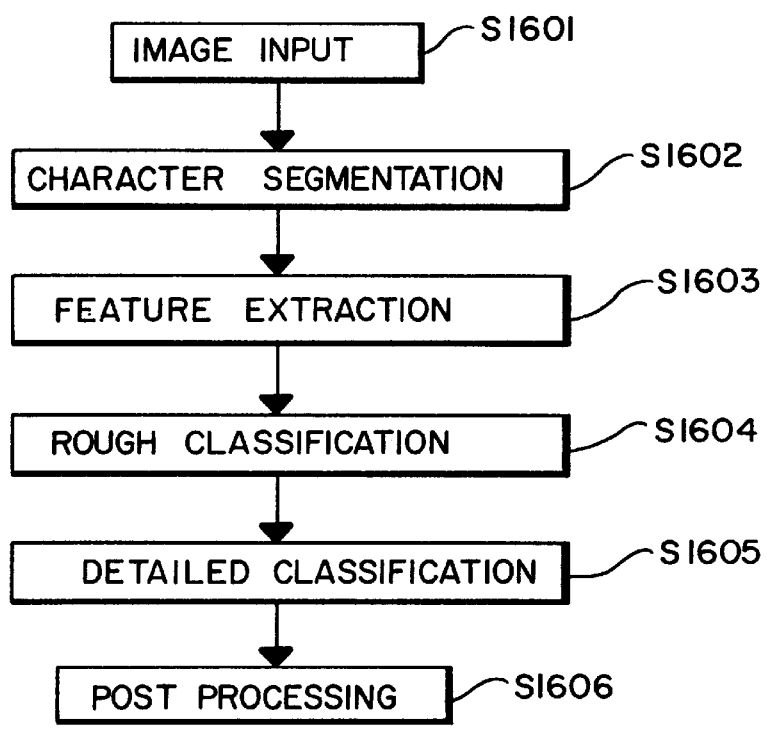
FIG. 16 is a flow chart for explaining a known pattern recognition process.

FIGS. 14 and 15 are views for explaining a further embodiment of the invention in which it is possible to preview the results of character recognition for word-processed text. Previewing provides assurance that the original word-processed text file can be recovered, through pattern recognition, from an image of the word-processed text. Thus, for example, in the case where word-processed text is facsimile-transmitted to a remote location (for example, by "PC-fax" directly from word processing equipment), previewing ensures that the image received at the remote location can be subjected to character recognition for the purposes of recovering the original word-processed text file.

As shown in FIG. 14, a text file 70 is printed out at 71 and facsimile-transmitted at 72. Alternatively, using "PC-fax", the need for a printout is avoided and as shown by the dotted arrow the text file 70 is converted to a print image at 76 and facsimile-transmitted at 72. The image received at facsimile reception 73 is subjected to character recognition at 74 to create a text file at 75. Character recognition 74 may be performed according to any of the above-described embodiments of pattern recognition systems.

To ensure that text file 75 contains the same information as text file 70, the results of image conversion, transmission and pattern recognition are previewed. Thus, the text file 70 is subjected to electronic image conversion 76. The image so created reflects the various fonts and type size that will be used at printout 71. The image converted at 76 is subjected to character recognition at 77 to form a text file at 78.

The original text file 70 is displayed at 79, and the pattern-recognized text file 78 is displayed at 80. The displays may be side by side as shown in FIG. 15 which depicts the appearance of data on the display. In addition, the text files are compared and discrepancies between the two text files are noted. Any such discrepancies, such as those indicated in reverse graphics at 90, indicate that the transmission process depicted at 71, 72, 73, 74 and 75 will not successfully recover the text file at 75. Accordingly, adjustments may be made in the text file, or the text file may be printed out using a different font, style, size, etc. Such modifications are made as necessary until text file 78 is identical to text file 70. At that point, it can be assured that the transmission process 72 will result in text file 78 that is identical to text file 70.

What is claimed is:

1. Pattern recognition apparatus comprising:

a host for inputting image information and for segmenting image information into pattern segments; and pattern recognition means for providing a candidate for a pattern segment transmitted from said host, said pattern recognition means including plural recognition modes, one of said plural recognition modes being initially designated in a first recognition processing step to provide candidates for pattern segments transmitted from said host; and reject character counting means for counting, after a predetermined number of pattern segments have been recognition-processed in the initially designated one of the plural recognition modes, a number of reject characters in the recognition-processed pattern segments, wherein, when the reject character counting means counts greater than a predetermined number of reject characters in the initially designated one of the plural pattern recognition modes, the pattern recognition means designates another one of the plural pattern recognition modes in a second recognition processing step.

2. Apparatus according to claim 1, further comprising a network bus to which said host is connected, and wherein said host is responsive to commands on said network bus for pattern recognition.

3. Apparatus according to claim 1, further comprising discrimination means for discriminating between character patterns and non-character patterns in said image information, and wherein said pattern recognition means provides a candidate in the case where a character pattern is discriminated by said discriminating means.

4. Apparatus according to claim 1, further comprising information processing means for processing character information corresponding to character patterns, and further comprising preview means for causing character information processed by said information processing means to be processed by said pattern recognition means.

5. A pattern recognition apparatus comprising:

a local area network bus;

an image input device connected to said network bus, said image input device for inputting image information;

pattern recognition means connected to said network bus, said pattern recognition means for providing a candidate for an unknown pattern and including plural recognition modes, one of said plural recognition modes being initially designated in a first recognition processing step to provide candidates for the pattern segments transmitted from the host;

reject character counting means for counting, after a predetermined number of pattern segments have been recognition-processed in the initially designated one of the plural recognition modes, a number of reject characters in the recognition-processed pattern segments, the pattern recognition means designating another one of the plural pattern recognition modes in a second recognition processing step responsive to greater than a predetermined number of reject characters being counted in the initially designated one of the plural pattern recognition modes; and plural processing means connected to said network bus, each said processing means for segmenting image information input by said image input device into segmented patterns, for providing a segmented pattern to said pattern recognition means, and for receiving the candidate from said pattern recognition means.

6. Apparatus according to claim 5, further comprising discrimination means for discriminating between character patterns and non-character patterns in said image information, and wherein said pattern recognition means provides a candidate in the case where a character pattern is discriminated by said discriminating means.

7. Apparatus according to claim 5, wherein each of said plural processing means includes information processing means for processing character information corresponding to character patterns, and further comprising preview means for causing character information processed by said information processing means to be processed by said pattern recognition means.

8. A pattern recognition method comprising the steps of:
   inputting image information;
   segmenting the image information into pattern segments;
   initially designating one of plural recognition modes in a first recognition processing step which provides candidates for the pattern segments;
   counting, after when a predetermined number of pattern segments have been recognition-processed in the initially designated one of the plural recognition modes, a number of reject characters in the recognition-processed pattern segments;
   designating another one of said plural recognition modes in a second recognition processing step responsive to greater than a predetermined number of counted reject characters in the initially designated one of the plural recognition modes; and
   providing a candidate for a pattern segment using the designated recognition mode.

9. A method according to claim 8, further comprising the step of connecting a host to a network bus, and wherein said host is responsive to commands on said network bus for pattern recognition.

10. A method according to claim 8, further comprising the step of discriminating between character patterns and non-character patterns in said image information, and providing a candidate in the case where a character pattern is discriminated in said discriminating step.

11. A method according to claim 8, further comprising the steps of processing character information corresponding to character patterns, and previewing pattern recognition for character information processed in said processing step.

12. A pattern recognition method comprising the steps of:
   inputting image information on an image input device connected to a local area network bus;
   segmenting image information input by said image input device into segmented patterns;
   providing a segmented pattern to a pattern recognizer having plural recognition modes;
   initially designating one of plural recognition modes in a first recognition processing step which provides candidates for the pattern segments;
   counting, after a predetermined number of pattern segments have been recognition-processed in the initially designated one of the plural recognition modes, a number of relect characters in the recognition-processed pattern segments;
   designating another one of said plural recognition modes in a second recognition processing step responsive to greater than a predetermined number of reject characters being counted in the one of the plural recognition modes; and
   providing a candidate for the segmented pattern.

13. A method according to claim 12, further comprising the steps of discriminating between character patterns and non-character patterns in said image information, and providing a candidate in the case where a character pattern is discriminated in said discriminating step.

14. A method according to claim 12, further comprising the steps of processing character information corresponding to character patterns, and previewing pattern recognition for character information processed in said information processing step.

15. Apparatus according to claim 1, wherein said plural recognition modes include at least a first recognition mode which utilizes a first dictionary and a second recognition mode which utilizes a second dictionary.

16. Apparatus according to claim 5, wherein said plural recognition modes include at least a first recognition mode which utilizes a first dictionary and a second recognition mode which utilizes a second dictionary.

17. Pattern recognition apparatus comprising:
   input means for inputting pattern segments;
   pattern recognition means for providing a candidate for an input pattern segment, said pattern recognition means including plural recognition modes, one of said plural recognition modes being initially designated in a first recognition processing step which provides candidates for the pattern segments; and
   reject character counting means for counting, after a predetermined number of pattern segments have been recognition-processed in the initially designated one of the plural recognition modes, a number of reject characters in the recognition-processed pattern segments,
   wherein the pattern recognition means designates another one of the plural pattern recognition modes in a second recognition processing step responsive to greater than a predetermined number of reject characters being counted in the initially designated one of the plural pattern recognition modes.

18. Apparatus according to claim 17, further comprising discrimination means for discriminating between character patterns and non-character patterns in said pattern segments, and wherein said pattern recognition means provides a candidate in the case where a character pattern is discriminated by said discriminating means.

19. Apparatus according to claim 17, further comprising information processing means for processing character information, and further comprising preview means for causing character information processed by said information processing means to be processed by said pattern recognition means.

20. Apparatus according to claim 17, wherein said plural recognition modes include at least a first recognition mode which utilizes a first dictionary and a second recognition mode which utilizes a second dictionary.

21. A pattern recognition method comprising the steps of:
   inputting pattern segments;
   initially designating one of plural recognition modes in a first recognition processing step which provides candidates for the pattern segments;
   counting, after a predetermined number of pattern segments have been recognition-processed in the initially designated one of the plural recognition modes, a number of reject characters in the recognition-processed pattern segments;

designating another one of said plural recognition modes in a second recognition processing step responsive to greater than a predetermined reject characters being counted in the initially designated one of the plural recognition modes; and providing a candidate for the pattern segment using the designated recognition mode.

22. A method according to claim 21, further comprising the step of discriminating between character patterns and non-character patterns in said pattern segments, and providing a candidate in the case where a character pattern is discriminated in said discriminating step.

23. A method according to claim 21, further comprising the steps of processing character information, and previewing pattern recognition for character information processed in said processing step.

24. A method according to claim 21, wherein said plural recognition modes include at least a first recognition mode which utilizes a first dictionary and a second recognition mode which utilizes a second dictionary.

25. Pattern recognition processing apparatus according to claim 1, further comprising a scanner for inputting the image information.

26. Pattern recognition processing apparatus according to claim 1, further comprising a display for displaying the result of the recognition.

27. A pattern recognition processing apparatus according to claim 5, further comprising a scanner for inputting the image information.

28. A pattern recognition processing apparatus according to claim 5, further comprising a display for displaying the result of the recognition.

29. A pattern recognition method according to claim 8, further comprising the step of inputting the image information by a scanner.

30. A pattern recognition method according to claim 8, further comprising the step of displaying the result of the recognition on a display.

31. A pattern recognition method according to claim 12, further comprising the step of inputting the image information by a scanner.

32. A pattern recognition method according to claim 12, further comprising the step of displaying the result of the recognition on a display.

33. A pattern recognition processing apparatus according to claim 17, further comprising a scanner for inputting the pattern segments.

34. A pattern recognition processing apparatus according to claim 17, further comprising a display for displaying the result of the recognition.

35. A pattern recognition method according to claim 21, further comprising the step of inputting the pattern segments by a scanner.

36. A pattern recognition method according to claim 21, further comprising the step of displaying the result of the recognition on a display.

* * * * *